United States Patent Office 3,840,469
Patented Oct. 8, 1974

3,840,469
COBALT CATALYST RECOVERY FROM ACETIC ACID MEDIUM DERIVED FROM LIQUID PHASE OXIDATION OF ALIPHATIC HYDROCARBONS
Charles C. Hobbs, Jr., and John C. Trebellas, Corpus Christi, Tex., and Juan L. Huguet, Buenos Aires, Argentina, assignors to Celanese Corporation, New York, N.Y.
No Drawing. Filed July 26, 1972, Ser. No. 275,395
Int. Cl. B01j 11/02, 11/82; C07c 53/08
U.S. Cl. 252—413    8 Claims

ABSTRACT OF THE DISCLOSURE

A process is provided for the recovery of cobalt (II) ions from an acetic acid medium and the production of a fresh solution of the same. The cobalt (II) ions are initially precipitated as either cobalt oxalate or cobalt sulfate, the precipitate separated, the precipitate digested with an acetic acid solution containing calcium ions wherein a precipitate of calcium is formed with the cobalt (II) ions being solubilized, and the calcium precipitate separated to form a fresh solution of Co(II) ions dissolved in acetic acid. The process of the present invention finds particular utility in the recovery and purification of cobalt catalyst from an acetic acid medium, e.g. following a liquid phase oxidation reaction.

BACKGROUND OF THE INVENTION

In recent years increasing utilization has been made of cobalt catalyzed chemical reactions wherein cobalt (II) ions are present in an acetic acid medium. For instance, carboxylic acids and other oxygenated aliphatic compounds may be obtained from the liquid phase oxidation of aliphatic hydrocarbons (e.g. n-butane) with molecular oxygen in an acetic acid reaction medium in the presence of cobalt acetate catalyst. A representative process of this general type is disclosed in U.S. Pat. No. 2,704,294 to Chester S. Morgan, Jr. and Nat C. Robertson.

There has remained, however, a need for an efficient technique whereby cobalt (II) ions may be recovered from an acetic acid medium, e.g. an acetic acid by-product stream resulting from a liquid phase oxidation reaction.

It is an object of the invention to provide a process for the recovery of cobalt (II) ions present in an acetic acid medium and the production of a fresh solution of the same.

It is an object of the invention to provide a process for the recovery of cobalt (II) ions from an acetic acid medium containing the same which is a by-product from a liquid phase oxidation reaction.

It is an object of the invention to provide an economical process for the recovery of cobalt catalyst from an acetic acid medium.

It is a further object of the invention to provide a process for selectively recovering cobalt catalyst from an acetic acid medium containing extraneous components and forming a fresh solution of the same which is substantially free of unwanted components.

These and other objects, as well as the scope, nature, and utilization of the process will be apparent from the following detailed description and appended claims.

SUMMARY OF THE INVENTION

It has been found that a process for the recovery of cobalt (II) ions initially present in an acetic acid medium and the production of a fresh solution of the same comprises:

(a) providing in a first acetic acid medium containing Co (II) ions a source of oxalate or sulfate ions in a quantity at least sufficient to react stoichiometrically with the cobalt (II) ions to form cobalt oxalate or cobalt sulfate, (b) forming a solid first precipitate of cobalt oxalate or cobalt sulfate in the first acetic acid medium, (c) separating the solid first precipitate of cobalt oxalate or cobalt sulfate from the first acetic acid medium, (d) contacting the solid first precipitate of cobalt oxalate or cobalt sulfate with a second acetic acid medium provided at an elevated temperature and containing calcium ions dissolved therein in a quantity at least equivalent stoichiometrically to the cobalt (II) ions of the cobalt oxalate or cobalt sulfate to form calcium oxalate or calcium sulfate, (e) forming a solid second precipitate of calcium oxalate or calcium sulfate in the second acetic acid medium while the cobalt (II) ions are solubilized, and (f) separating the solid second precipitate of calcium oxalate or calcium sulfate from the second acetic acid medium to produce a fresh solution of Co(II) ions dissolved in acetic acid.

DESCRIPTION OF PREFERRED EMBODIMENTS

The acetic acid medium containing cobalt (II) ions present therein which undergoes treatment in accordance with the present process may be derived from a variety of sources as will be apparent to those skilled in the art. The cobalt (II) ions are commonly present in the same in catalytic quantities, i.e. about 0.0005 to 3 percent by weight and more commonly in a quantity of about 0.005 to 0.5 percent by weight based upon the weight of the total solution. The acetic acid medium is preferably a byproduct stream resulting from a cobalt catalyzed liquid phase oxidation reaction, e.g. a spent liquid phase oxidation catalyst stream, or a liquid phase oxidation blow down stream. The acetic acid medium will commonly contain dissolved Co(II) ions as well as at least some cobalt (II) ions which are chemically combined within a solid sludge or precipitate suspended within the medium, such as cobalt oxalate. Such cobalt oxalate precipitate will likely be present in the medium to at least some degree if the medium was obtained from a liquid phase oxidation system wherein any oxalic acid was formed. Other extraneous components such as water, esters, ketones, hydrocarbons, carboxylic acids, corrosion ions (e.g. Fe, Cr, Mn, Ni, Mo), etc. are likely also to be present in the acetic acid medium in varying concentrations if derived from a previously concluded liquid phase oxidation reaction.

If an appreciable concentration of cobalt (III) ions is present in an acetic acid medium which is ultimately to undergo treatment in accordance with the present process, then it is recommended that these ions initially be reduced to cobalt (II) ions. Suitable agents for this purpose include formic acid, hydrogen peroxide, hydroxylamine, etc. The oxidation-reduction reaction may be conveniently carried out at room temperature through reaction with hydrogen peroxide. Alternatively, such reduction of Co(III) ions may be simply conducted by adding a quantity of oxalic acid as described hereafter which is substantially in excess of the stoichiometric amount required to react with the cobalt (II) ion concentration otherwise present in the solution.

The acetic acid medium undergoing treatment in the process of the invention preferably contains about 3 to 15 percent water by weight, and more preferably about 3 to 5 percent water by weight prior to forming the first precipitate described hereafter. The water component aids in the production of a solid precipitate of optimum separability.

A source of oxalate or sulfate ions is provided in the acetic acid medium containing Co(II) ions at least sufficient to react stoichiometrically with the Co(II) ions to form cobalt oxalate or cobalt sulfate. In a preferred embodiment of the process a stoichiometric excess of about 5 to 20 percent of oxalate or sulfate ions is provided in the acetic acid medium. Representative sources of oxalate ions include oxalic acid, sodium oxalate, potassium oxalate, etc. The preferred source of oxalate ions is oxalic acid. Representative sources of sulfate ions include sulfuric acid, sodium sulfate, potassium sulfate, etc. The preferred source of sulfate ions is sulfuric acid. The acetic acid solution is preferably stirred or otherwise agitated as the precipitate of cobalt oxalate or cobalt sulfate is formed therein. The acetic acid medium is preferably maintained at a temperature of about 20 to 150° C., and more preferably at a temperature of about 60 to 100° C. as the solid precipitate forms therein. Should additional extraneous metallic cations, such as iron, chromium, nickel, or manganese, also be present in the acetic acid medium, these form oxalates or sulfates which tend to be relatively soluble in the acetic acid medium and do not form solid precipitates therein simultaneously with the formation of cobalt oxalate or cobalt sulfate. Upon long standing precipitates of other cations (e.g. chromium) may form; however, the solid precipitate of cobalt oxalate or cobalt sulfate is separated (as described hereafter) prior to such additional precipitation.

The solid precipitate of cobalt oxalate or cobalt sulfate is next separated from the acetic acid medium. Conventional separation techniques may be utilized such as decantation, filtration, or centrifugation. In a preferred embodiment of the process the cobalt oxalate or cobalt sulfate precipitate is separated through the use of a rotary drum filter. The cobalt oxalate or cobalt sulfate precipitate following separation is preferably washed with acetic acid prior to further processing.

The solid precipitate of cobalt oxalate or cobalt sulfate is contacted with an additional acetic medium (e.g. glacial acetic acid) provided at an elevated temperature and containing calcium ions dissolved therein in a quantity at least equivalent stoichiometrically to the Co(II) ions of the cobalt oxalate or cobalt sulfate to form calcium oxalate or calcium sulfate. This acetic acid medium preferably also contains about 3 to 15 percent water by weight, and most preferably about 5 to 10 percent water by weight. The water component aids in the production of a solid precipitate of optimum filterability. In a preferred embodiment of the process a stoichiometric excess of about 5 to 20 percent (e.g. 10 to 15 percent) of calcium ions is provided in the acetic acid medium. Representative sources of calcium ions include calcium acetate, calcium oxide (lime), calcium hydroxide (slaked lime), calcium carbonate, etc. The preferred source of calcium ions is calcium carbonate. The acetic acid is preferably stirred and provided at a temperature of about 60 to 140° C., and more preferably at a temperature of about 75 to 125° C. while the precipitate of cobalt oxalate or cobalt sulfate is contacted with the same while in particulate form. During such digestion step a solid second precipitate (commonly white) of calcium oxalate or calcium sulfate is formed while the cobalt (II) ions are solubilized and pass into solution.

The solid precipitate of calcium oxalate or calcium sulfate is next separated from the acetic acid medium to produce a fresh solution of Co(II) ions dissolved in acetic acid. Conventional separation techniques may be utilized such as decantation, filtration, or centrifugation. In a preferred embodiment of the process the calcium oxalate or calcium sulfate precipitate is separated through the use of a rotary drum filter.

The resulting acetic acid solution containing cobalt (II) ions may be utilized directly as the solvent in a conventional liquid phase oxidation system. Alternatively, the cobalt component may be recovered from the solution in a substantially pure form as cobalt acetate upon crystallization.

The following examples are given as specific illustrations of the invention. It should be understood, however, that the invention is not limited to the specific details set forth in the examples.

EXAMPLE I

A contaminated acetic acid medium containing cobalt catalyst derived from a butane liquid phase oxidation reaction is selected as the starting material. The medium contains cobalt (II) ions dissolved and dispersed therein in a total concentration of about 0.05 percent by weight, water in a concentration of about 8 percent by weight, extraneous metallic cations, such as iron, chromium, nickel, and manganese in a total concentration of about 0.4 percent by weight, and organic by-products such as succinic acid and gamma-butyrolactone, in a total concentration of about 2 percent by weight.

To 100 parts by weight of the acetic acid medium provided in a stirred reaction vessel at a temperature of about 80° C. is added 0.085 part by weight of anhydrous oxalic acid (about a 10 percent excess of the stoichiometric amount with respect to the cobalt). A solid particulate precipitate of cobalt oxalate is formed which is suspended within the acetic acid medium. Other extraneous metallic cations such as iron, chromium, and manganese present in the medium remain in solution and fail to undergo precipitation.

The solid precipitate of cobalt oxalate next is separated from the acetic acid medium by use of a rotary drum filter, and is washed with acetic acid.

The solid precipitate of cobalt oxalate is next added to an additional acetic acid medium provided in a stirred reaction vessel at a temperature of about 100° C.; said acetic acid medium is prepared by mixing 89 percent by weight glacial acetic acid, 10 percent by weight of water, and 1 percent by weight of calcium carbonate (about a 10 percent excess of the stoichiometric amount with respect to cobalt). After the passage of 30 minutes, a solid particulate precipitate of calcium oxalate forms therein and the cobalt (II) ions of the cobalt oxalate are substantially completely solubilized.

The solid precipitate of calcium oxalate is separated by use of a rotary drum filter to produce a fresh solution of cobalt (II) ions dissolved in acetic acid. The solution may be used directly as the solvent system in a subsequent butane liquid phase oxidation reaction.

EXAMPLE II

The cobalt catalyst recovery process of Example I is repeated with the exceptions indicated.

To 100 parts by weight of an identical contaminated acetic acid catalyst solution provided in a stirred reaction vessel at a temperature of about 25° C. are added 1.85 parts by weight of a 1 normal sulfuric acid solution dissolved in acetic acid (about a 10 percent excess of the stoichiometric amount with respect to cobalt). A solid precipitate of cobalt sulfate forms which is suspended within the acetic acid medium. Other extraneous metallic cations such as iron, chromium, and manganese present in the medium remain in solution and fail to undergo precipitation.

The solid precipitate of cobalt sulfate is separated, washed with acetic acid, and is reacted in a second acetic acid medium as previously described in connection with Example I. A precipitate of calcium sulfate forms therein and the cobalt (II) ions of the cobalt sulfate are substantially completely solubilized.

The solid precipitate of calcium sulfate is separated by use of a rotary drum filter to produce a fresh solution of cobalt (II) ions dissolved in acetic acid. The solution likewise may be used directly as the solvent system in a subsequent butane liquid phase oxidation reaction.

We claim:

1. A process for the recovery of cobalt (II) ions initially present in a first liquid medium consisting essentially of acetic acid derived from the liquid phase oxidation of an aliphatic hydrocarbon and the production of a fresh solution of the same comprising:

(a) incorporating into said first acetic acid medium containing cobalt (II) ions and about 3 to 15 percent water by weight a source of oxalate ions in a quantity at least sufficient to react stoichiometrically with said cobalt (II) ions to form cobalt oxalate, (b) forming a solid precipitate of cobalt (II) oxalate in said first acetic acid medium while at a temperature of about 20 to 150° C., (c) separating said precipitate of cobalt oxalate from said first acetic acid medium, (d) contacting said separated precipitate of cobalt oxalate with a second medium consisting essentially of acetic acid containing about 3 to 15 percent water by weight provided at an elevated temperature of about 60 to 140° C. and containing calcium ions dissolved therein in a quantity at least equivalent stoichiometrically the cobalt (II) ions contained in said cobalt oxalate to form calcium oxalate, (e) forming a solid precipitate of calcium oxalate in said second acetic acid medium while said cobalt (II) ions are solubilized, and (f) separating said solid precipitate of calcium oxalate from said second acetic acid medium to produce a fresh solution of Co(II) ions dissolved in acetic acid.

2. A process according to Claim 1 wherein said source of oxalate ions is selected from the group consisting of oxalic acid, sodium oxalate, and potassium oxalate.

3. A process according to Claim 1 wherein said second acetic acid medium is provided at an elevated temperature of about 75 to 125° C. when in contact with said solid first precipitate of cobalt oxalate.

4. A process according to Claim 1 wherein said calcium ions dissolved in said second acetic acid medium in a quantity at least equivalent stoichiometrically to said cobalt (II) ions are derived from a calcium compound selected from the group consisting of calcium acetate, calcium oxide, calcium hydroxide, and calcium carbonate.

5. A process for the recovery of cobalt (II) ions initially present in a first liquid medium consisting essentially of acetic acid derived from the liquid phase oxidation of an aliphatic hydrocarbon and the production of a fresh solution of the same comprising:

(a) incorporating into said first acetic acid medium containing cobalt (II) ions and about 3 to 15 percent water by weight a source of sulfate ions in a quantity at least sufficient to react stoichiometrically with said cobalt (II) ions to form cobalt sulfate, (b) forming a solid precipitate of cobalt (II) sulfate in said first solution while at a temperature of about 20 to 150° C., (c) separating said solid precipitate of cobalt sulfate from said first acetic acid medium, (d) contacting said separated solid precipitate of cobalt sulfate with a second medium consisting essentially of acetic acid containing about 3 to 15 percent water by weight provided at an elevated temperature of about 60 to 140° C. and containing calcium ions dissolved therein in a quantity at least equivalent stoichiometrically to the cobalt (II) ions contained in said cobalt sulfate to form calcium sulfate, (e) forming a solid precipitate of calcium sulfate in said second acetic acid medium while said cobalt (II) ions are solubilized, and (f) separating said solid precipitate of calcium sulfate from said second acetic acid medium to produce a fresh solution of Co(II) ions dissolved in acetic acid.

6. A process according to Claim 5 wherein said source of sulfate ions is selected from the group consisting of sulfuric acid, sodium sulfate, and potassium sulfate.

7. A process according to Claim 5 wherein said second acetic acid medium is provided at an elevated temperature of about 75 to 125° C. when in contact with said solid precipitate of cobalt sulfate.

8. A process according to Claim 5 wherein said calcium ions dissolved in said second acetic acid medium in a quantity at least equivalent stoichiometrically to said cobalt (II) ions are derived from a calcium compound selected from the group consisting of calcium acetate, calcium oxide, calcium hydroxide, and calcium carbonate.

References Cited
UNITED STATES PATENTS

| | | | |
|---|---|---|---|
| 3,673,154 | 6/1972 | Trevillyan | 260—439 R |
| 3,067,248 | 12/1962 | Hetzel | 260—525 |
| 3,317,574 | 5/1967 | Morita et al. | 260—439 R |
| 3,091,626 | 5/1963 | Carlson | 260—439 R |
| 3,033,899 | 5/1962 | Knobloch et al. | 260—525 |
| 2,704,294 | 3/1955 | Morgan, Jr., et al. | 260—451 |
| 3,644,512 | 2/1972 | Onopchenko et al. | 260—533 R |

DANIEL E. WYMAN, Primary Examiner

P. E. KONOPKA, Assistant Examiner

U.S. Cl. X.R.

252—431 C; 260—439 R, 451, 533 R; 423—140, 544, 555

UNITED STATES PATENT OFFICE
CERTIFICATE OF CORRECTION

Patent No. 3,840,469    Dated October 8, 1974

Inventor(s) Charles C. Hobbs, Jr., John C. Trebellas, and Juan L. Huguet

It is certified that error appears in the above-identified patent and that said Letters Patent are hereby corrected as shown below:

In column 5, line 29, after "stoichiometrically", insert -- to --.

Signed and sealed this 17th day of December 1974.

(SEAL)
Attest:

McCOY M. GIBSON JR.
Attesting Officer

C. MARSHALL DANN
Commissioner of Patents